(12) United States Patent
Brand et al.

(10) Patent No.: US 12,292,727 B2
(45) Date of Patent: May 6, 2025

(54) CONTROL DEVICE FOR USE ON A NUMERICALLY CONTROLLED MACHINE TOOL, AND MACHINE TOOL COMPRISING A CONTROL DEVICE

(71) Applicant: DECKEL MAHO Seebach GmbH, Seebach (DE)

(72) Inventors: Matthias Brand, Seebach (DE); Ines Schmidt, Waltershausen (DE); Isabella Glöde, Wutha-Farnroda (DE)

(73) Assignee: DECKEL MAHO Seebach GmbH, Seebach (DE)

( * ) Notice: Subject to any disclaimer, the term of this patent is extended or adjusted under 35 U.S.C. 154(b) by 497 days.

(21) Appl. No.: 17/618,558

(22) PCT Filed: May 14, 2020

(86) PCT No.: PCT/EP2020/063417
§ 371 (c)(1),
(2) Date: Dec. 13, 2021

(87) PCT Pub. No.: WO2020/249354
PCT Pub. Date: Dec. 17, 2020

(65) Prior Publication Data
US 2022/0244701 A1 Aug. 4, 2022

(30) Foreign Application Priority Data
Jun. 13, 2019 (DE) ..................... 10 2019 208 624.1

(51) Int. Cl.
*G05B 19/4065* (2006.01)
(52) U.S. Cl.
CPC ..................... *G05B 19/4065* (2013.01); *G05B 2219/32193* (2013.01); *G05B 2219/37252* (2013.01); *G05B 2219/50276* (2013.01)

(58) Field of Classification Search
CPC ...... G05B 19/4065; G05B 2219/32193; G05B 2219/37252; G05B 2219/50276;
(Continued)

(56) References Cited

U.S. PATENT DOCUMENTS

2017/0060104 A1* 3/2017 Genma .............. G05B 13/0265
2018/0067471 A1 3/2018 Saitou et al.
(Continued)

FOREIGN PATENT DOCUMENTS

| CN | 107584334 A | 1/2018 |
| DE | 102015115838 A1 | 3/2017 |

(Continued)

OTHER PUBLICATIONS

International Search Report dated Sep. 10, 2020 for PCT App. Ser. No. PCT/EP2020/063417.
(Continued)

*Primary Examiner* — Thomas C Lee
*Assistant Examiner* — Tyler Dean Hedrick
(74) *Attorney, Agent, or Firm* — Henricks Slavin LLP

(57) ABSTRACT

The present invention relates to a control device 200 for use on a numerically controlled machine tool 100, comprising a machine control unit 230 for controlling actuators of the machine tool for a machining process for a workpiece to be performed on the machine tool 100, in particular on the basis of control data, and a monitoring unit 250 for monitoring an operating state of the machine tool 100. In accordance with the invention, the monitoring unit 250 has a computer-implemented neural network 253 (NN), which in particular is designed to read input data from the machine control unit 230 and to output output data specifying an operating state of the machine tool 100.

22 Claims, 3 Drawing Sheets

(58) Field of Classification Search
CPC ...... G05B 2219/49308; G05B 19/4061; Y02P 90/02; B23Q 15/00; B23Q 17/00
See application file for complete search history.

(56) References Cited

U.S. PATENT DOCUMENTS

| | | |
|---|---|---|
| 2018/0157226 A1 | 6/2018 | Okuda |
| 2018/0231953 A1* | 8/2018 | Watanabe .......... G05B 13/0265 |
| 2018/0264613 A1 | 9/2018 | Tamai et al. |
| 2019/0137969 A1* | 5/2019 | Watanabe .......... G05B 19/4063 |
| 2020/0086487 A1* | 3/2020 | Johnson ................. B25J 9/1664 |
| 2021/0046649 A1* | 2/2021 | Shibata .................. B25J 9/1664 |

FOREIGN PATENT DOCUMENTS

| | | |
|---|---|---|
| EP | 2482156 A1 | 8/2012 |
| JP | 1992-75848 A | 3/1992 |

OTHER PUBLICATIONS

English Translation of Examination Report dated Jul. 17, 2020 for corresponding German App. Ser. No. 10 2019 208 624.1.
Weck and Brecher, Werkzeugmaschinen 3, Kapitel 6 (2006).
Office Action dated Mar. 1, 2024 for CN App. Ser. No. 202080049579.4 with English translation.
Office Action dated Aug. 28, 2024 for CN App. Ser. No. 202080049579.4 with English translation.
Office Action dated Jan. 26, 2025 for CN App. Ser. No. 202080049579.4 with English translation.

* cited by examiner

CONTROL DEVICE FOR USE ON A NUMERICALLY CONTROLLED MACHINE TOOL, AND MACHINE TOOL COMPRISING A CONTROL DEVICE

The present invention relates to a control device for use on a numerically controlled machine tool and a machine tool comprising such a control device, in particular for monitoring the numerically controlled machine tool, in particular by means of a monitoring unit of the control device. The present invention further relates to a method for monitoring a numerically controlled machine tool, in particular by means of a control device or a monitoring unit of the control device, as well as a corresponding computer program product for a control device of a machine tool.

BACKGROUND

Numerically controlled machine tools for machining workpieces, such as milling machines, lathes, milling/turning machines, grinding machines, universal machine tools, turning centers, machining centers, gear cutting machines, etc., are known in the prior art.

Such machine tools or CNC machine tools of the generic kind typically comprise a control device (machine controller) for use on the numerically controlled machine tool, comprising a machine control unit for controlling actuators, in particular drives such as spindle drives and axis drives of linear, rotary and swivel axis drives, of the machine tool for a machining process for machining a workpiece, in particular on the basis of control data or on the basis of control data comprising an NC program.

From EP 2 482 156 A1, for example, it is known to carry out process monitoring while the workpiece is being machined on the machine tool, in particular in order to carry out collision monitoring on the machine tool. For example, this may be carried out according to the teaching EP 2 482 156 A1 on the basis of a collision sensor measuring a vibration, wherein the sensor signal is continuously compared with one or more limit values when the workpiece is being machined during the operation of the machine tool and a collision can be detected when the limit value is exceeded.

From EP 2 482 156 A1, a control device of the generic kind or machine tool with such a control device is known, comprising a machine control unit for controlling actuators of the machine tool for a machining process of a workpiece to be performed on the machine tool, in particular on the basis of control data, and a monitoring unit for monitoring the machine tool on the basis of sensor data from a collision sensor.

With regard to process monitoring on machine tools, it is generally desirable to monitor the machining process on the machine tool in such a way that a wide variety of potential problems that may arise during workpiece machining, such as collision, bearing wear or bearing damage, tool wear, tool breakage, breakage of clamping means, drive damage, etc. can be recognized quickly and identified as reliably as possible, or it is possible to react quickly to such problems, for example by means of an automatic drive stop or even an automatic machine stop, in which case any downtimes due to possible incorrect identifications are also to be avoided.

Based on the above prior art, it is therefore an object of the present invention to provide process monitoring on a machine tool which is improved compared to the prior art and, in particular, can react faster, more precisely, more variably and/or more sensitively to problems occurring during processing and can recognize these better and/or can avoid false identifications better while carrying out reliable process monitoring.

SUMMARY

According to the present invention, a control device for use on a numerically controlled machine tool, a corresponding machine tool, a method for monitoring a machine tool and a corresponding computer program product according to the independent claims are proposed. The dependent claims relate to preferred exemplary embodiments of the present invention that may be provided individually or also in combination.

According to an aspect of the present invention, a control device for use on a numerically controlled machine tool is proposed, comprising: a machine control unit for controlling actuators of the machine tool for a machining process of a workpiece to be performed on the machine tool, in particular on the basis of control data, and a monitoring unit for monitoring an operating state of the machine tool.

According to the invention, the monitoring unit of the control device includes a computer-implemented neural network or artificial neural network configured to read input data from the machine control unit and to output output data indicating an operating state of the machine tool.

It is to be noted that DE 10 2015 115 838 A1 already seems to describe the use of a neural network in connection with a machine tool, the neural network, however, apparently being used in an evaluation unit to evaluate temperature measurement management and—in contrast to the present invention—being provided for the purpose of compensating or correcting temperature-related changes in position on the machine tool in DE 10 2015 115 838 A1. However, DE 10 2015 115 838 A1 is not able to teach or suggest that a neural network can be used for tool or process monitoring or for monitoring an operating state of the machine tool.

Consequently, according to exemplary embodiments of the present invention, it is proposed, in a manner new and different from the prior art, to carry out tool or process monitoring of the machine tool by means of an artificial or computer-implemented neural network provided on the control device of the machine tool.

Advantageously, such tool or process monitoring can protect the machine and/or the workpieces from damage, can guarantee optimal tool use and, if necessary, can provide starting points for process optimization.

Thus, productivity can be increased and the overall life cost of the machine tool can be reduced. At the same time, the possible tool and process monitoring can contribute to quality assurance and allows for workpiece control and quality or process documentation.

Advantageously, direct error or problem detection (e.g., collision detection, detection of broken, worn or missing tools) can be made possible and a corresponding reaction, e.g. a machine stop or tool change, can be triggered automatically as well as immediately and without delay. This also allows for further cost reductions and fewer rejects, e.g. through wear-dependent tool changes or bearing maintenance.

In addition, by means of continuous adaptation of the process parameters on the basis of the output data of the neural network, for example, an optimized machining speed can be achieved. Furthermore, there are advantages due to the possibility of evaluating the historical output data and the historical training data, e.g. for documentation and statistics.

In summary, in particular the following advantages can be achieved in exemplary embodiments: comprehensive protection of machine, workpiece and tool, monitoring in real time, optimal tool utilization, monitoring of part quality (e.g. via documentation and process analysis), reduction of rejects and/or adaptation to complex processes or machining.

In addition, there is the advantage in exemplary embodiments that sensorless monitoring can also be provided due to the possibility of utilizing data or information (e.g., drive data and/or positioning data) available at the machine control, or at least some or additional sensors can be dispensed with. In further exemplary embodiments, the input data of the neural network may be supported with sensor data or provided from sensor data, e.g. by additional or alternative sensors, e.g. for strain, force, active power, torque, vibration, acceleration, structure-borne sound and/or temperature, etc.

Some exemplary embodiments of the present invention are described below, although this is not to be understood as being exhaustive or restrictive. It should also be pointed out that such exemplary aspects may be provided individually or in combination.

According to exemplary preferred embodiments, the monitoring unit, in particular the neural network of the monitoring unit, may preferably be configured to read the input data from the machine control unit during the ongoing machining process of a workpiece to be performed on the machine tool, in particular in real time, and/or to output output data indicating the current operating state of the machine tool, in particular during the ongoing machining process of a workpiece to be performed on the machine tool, in particular in real time.

According to exemplary preferred embodiments, the monitoring unit, in particular the neural network of the monitoring unit, may be configured to evaluate the output data of the neural network.

According to exemplary preferred embodiments, the monitoring unit, in particular the neural network of the monitoring unit, may be configured to evaluate the output data of the neural network for tool monitoring and/or process monitoring on the machine tool.

According to exemplary preferred embodiments, the monitoring unit, in particular the neural network of the monitoring unit, may be configured to output control data influencing the machining process to the machine control unit on the basis of the input data and/or on the basis of an evaluation of the output data.

According to exemplary preferred embodiments, the monitoring unit, in particular the neural network of the monitoring unit, may be configured to determine on the basis of the input data and/or on the basis of an evaluation of the output data when the machine tool is in an abnormal operating state.

An abnormal operating state may be or include, for example: a collision (e.g. of machine parts or the tool and/or workpiece with machine parts), (possibly excessive) tool wear, tool breakage, (possibly excessive) bearing wear, bearing damage, breakage of clamping means, drive damage, etc.

According to exemplary preferred embodiments, the monitoring unit, in particular the neural network of the monitoring unit, may be configured to determine on the basis of the input data and/or on the basis of an evaluation of the output data when a probability of an abnormal operating state of the machine tool occurring exceeds a predetermined limit value.

According to exemplary preferred embodiments, the monitoring unit, in particular the neural network of the monitoring unit, may be configured to output control data influencing the machining process to the machine control unit when it is determined that an abnormal operating state of the machine tool is present and/or a probability of an abnormal operating state of the machine tool occurring exceeds the predetermined limit value.

According to exemplary preferred embodiments, the abnormal operating state may be a collision occurring on the machine tool.

According to exemplary preferred embodiments, the abnormal operating state may be a tool breakage occurring on the machine tool.

According to exemplary preferred embodiments, the abnormal operating state may be a tool that is missing on the machine tool and is to be used in the machining process.

According to exemplary preferred embodiments, the monitoring unit, in particular the neural network of the monitoring unit, may be configured to output control data triggering a drive stop and/or a machine stop to the machine control unit, in particular preferably such that the machine control unit triggers a drive stop and/or a machine stop on the machine tool on the basis of the control data, when it is determined that the abnormal operating state of the machine tool is present and/or a probability of the abnormal operating state of the machine tool occurring exceeds the predefined limit value.

According to exemplary preferred embodiments, the abnormal operating state may be that increased tool wear of a tool used in the machining process or tool wear of the tool used in the machining process exceeding a limit value occurs on the machine tool.

According to exemplary preferred embodiments, the abnormal operating state may be increased bearing wear of a bearing of the machine tool occurring on the machine tool or bearing damage on the machine tool.

According to exemplary preferred embodiments, the monitoring unit, in particular the neural network of the monitoring unit, may be configured to output control data triggering an automatic tool change to the machine control unit, in particular such that the machine control unit triggers an automatic tool change on the machine tool on the basis of the control data, when it is determined that the abnormal operating state of the machine tool is present and/or a probability of the abnormal operating state of the machine tool occurring exceeds the predefined limit value (in particular when the abnormal operating state comprises a possibly excessive tool wear or tool breakage being detected).

According to exemplary preferred embodiments, the monitoring unit, in particular the neural network of the monitoring unit, may be configured to adjust process parameters present at the machine control unit on the basis of the input data and/or on the basis of an evaluation of the output data.

According to exemplary preferred embodiments, the monitoring unit, in particular the neural network of the monitoring unit, may be configured to adjust control data present at the machine control unit on the basis of the input data and/or on the basis of an evaluation of the output data.

According to exemplary preferred embodiments, the monitoring unit, in particular the neural network of the monitoring unit, may be configured to adjust control data present at the machine control unit and/or process parameters present at the machine control unit in such a way that a machining speed of the machining process is adjusted, in particular by adjusting the feed rates occurring during the machining process.

According to exemplary preferred embodiments, the input data may indicate operating parameters of actuators or drives of the machine tool, in particular drive speeds, motor currents and/or actuator signals output to actuators.

According to exemplary preferred embodiments, the input data may indicate position values of movable components of the machine tool, in particular actual and/or target positions of linear, rotary and/or swivel axes of the machine tool.

According to exemplary preferred embodiments, the input data may indicate sensor values from sensors of the machine tool, in particular sensor values from temperature sensors, force sensors, strain sensors, torque sensors, acceleration sensors, oscillation or vibration sensors and/or structure-borne sound sensors.

According to exemplary preferred embodiments, the monitoring unit may include an internal data storage device and/or may be configured for communication with an external data storage device. The monitoring unit may preferably be configured to store input data and/or output data of the neural network in the internal and/or external data storage device and/or to store evaluation data generated based on an evaluation of the input data and/or output data of the neural network in the internal and/or external data storage device.

According to exemplary preferred embodiments, the control device may furthermore comprise a human-machine interface that can be operated by an operator, in particular with a graphical user interface. The monitoring unit may preferably be configured to output output data of the neural network indicating the operating state of the machine tool to the operator on the human-machine interface.

According to further aspects of the present invention, preferably, a machine tool is proposed comprising a control device according to one or more of the above aspects or embodiments.

According to further aspects of the present invention, preferably, a method for monitoring a numerically controlled machine tool, in particular by means of a control device according to one or more of the above aspects or embodiments, is proposed.

The method preferably comprises controlling actuators of the machine tool for a machining process of a workpiece to be performed on the machine tool, in particular on the basis of control data, by means of a machine control unit, and monitoring an operating state of the machine tool by means of a monitoring unit, further preferably comprising reading input data from the machine control unit into a neural network computer-implemented on the monitoring unit and/or outputting output data indicating an operating state of the machine tool from the neural network.

Preferably, the method additionally or alternatively comprises monitoring an operating state of the machine tool by means of a monitoring unit during the control of actuators of the machine tool for a machining process of a workpiece to be performed on the machine tool, in particular on the basis of control data. The method preferably comprises reading input data from the machine control unit into a neural network computer-implemented on the monitoring unit and/or outputting output data indicating an operating state of the machine tool from the neural network.

According to further aspects of the present invention, preferably a computer program product comprising commands is proposed which, during the execution of the program by a computer connected to a numerically controlled machine tool or a (preferably computer-implemented) control device of a numerically controlled machine tool, in particular according to one of the preceding aspects or embodiments, cause it to carry out the method according to the above aspects or embodiments.

Further aspects and their advantages as well as advantages and more specific implementation possibilities of the aspects and features described above are described in the following descriptions and explanations of the attached figures which are in no way restrictive.

DETAILED DESCRIPTION OF THE FIGURES AND PREFERRED EMBODIMENTS

In the following, examples and exemplary embodiments of the present invention are described in detail with reference to the accompanying figures. Identical or similar elements in the figures may be denoted by the same reference symbols, but sometimes also by different reference symbols.

It should be emphasized that the present invention, however, is in no way limited or restricted to the exemplary embodiments described below and their implementation features, but rather further includes modifications of the exemplary embodiments, in particular those that are included within the scope of protection of the independent claims via modifications of the features of the examples described or via combinations of one or more individual features of the examples described.

Figure 1:
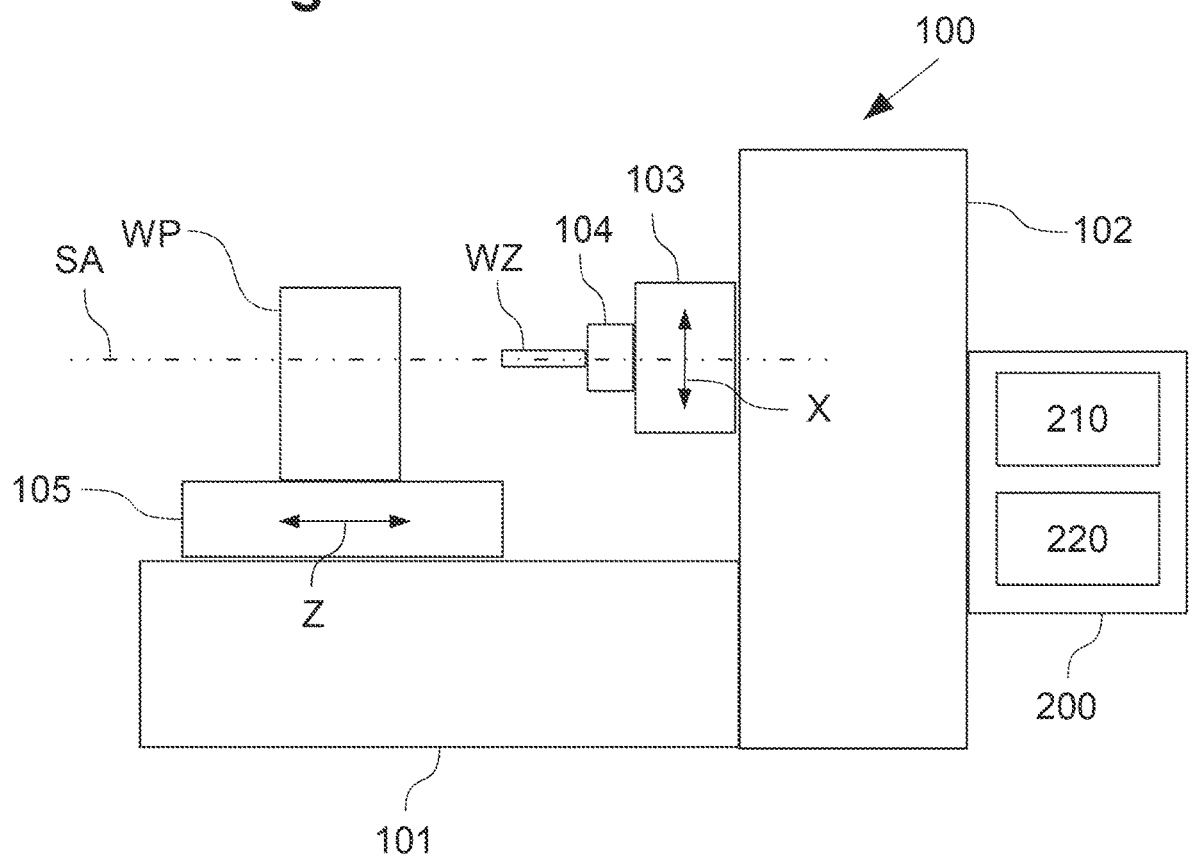
FIG. 1 shows a schematic exemplary diagram of a numerically controlled machine tool.

FIG. 1 shows a schematic exemplary diagram of a numerically controlled machine tool 100, for example configured as a milling machine.

However, the present invention is not limited to milling machines, but may also be used on other types of machine tools, e.g. on cutting machine tools configured for workpiece machining, e.g. by drilling, milling, turning, grinding, such as milling machines, universal milling machines, lathes, turning centers, automatic lathes, milling/turning machines, machining centers, grinding machines, gear cutting machines, etc.

The machine tool 100 comprises, for example, a machine frame with a machine bed 101 and a machine stand 102. For example, a movable machine slide 105, which is mounted so as to be movable horizontally on the machine bed 101 in a Z-direction (Z-axis), for example, is arranged on the machine bed 101. A workpiece WP is clamped, for example, on the machine slide 105, which may comprise a workpiece table, for example. For this purpose, clamping means may also be provided on the machine slide 105 or tool table. In addition, in further exemplary embodiments, the machine slide 105 may comprise a turntable which can be rotated or pivoted about a vertical and/or further horizontal axis (optional rotary or round and/or swivel axis). Furthermore (or alternatively) the machine slide 105 may be moved by means of a Y-axis in a horizontal Y-direction (potentially perpendicular to the plane of the drawing).

The machine stand 102 carries, for example, a spindle carrier slide 103 which can be moved vertically in an X direction on the machine stand 102 and on which a work spindle 104 carrying tools is held, for example. The work spindle 104 is configured to drive the tool WZ received on the work spindle 104 (e.g. a drilling and/or milling tool) to rotate about the spindle axis SA. For example, the spindle carrier slide 103 may be moved vertically in the X direction by means of an X axis. Furthermore (or alternatively) the spindle carrier slide 103 may be moved by means of a Y-axis in a horizontal Y-direction (which is potentially perpendicular to the plane of the drawing). In addition, in further exemplary embodiments, the spindle carrier slide 103 may comprise a rotary and/or swivel axis in order to rotate or swivel the spindle 104 (optional rotary or round and/or swivel axis).

Furthermore, the machine tool 100 comprises, for example, a control device 200 which, for operation by an operator of the machine tool 100, comprises, for example, a screen 210 (e.g. configured as a touch screen) and an input unit 220. The input unit 220 may comprise, for example, means for user input or for receiving user commands or command actions by the operator, such as buttons, sliders, rotary controls, a keyboard, switches, a mouse, a trackball and possibly also one or more touch-sensitive surfaces (e.g., a touch screen that can be combined with the screen 210).

The operator may use the control device 200 to control the operation of the machine tool or machine processes on the machine tool and also to monitor an operating state of the machine tool 100 or the machining process during machining.

Figure 2:
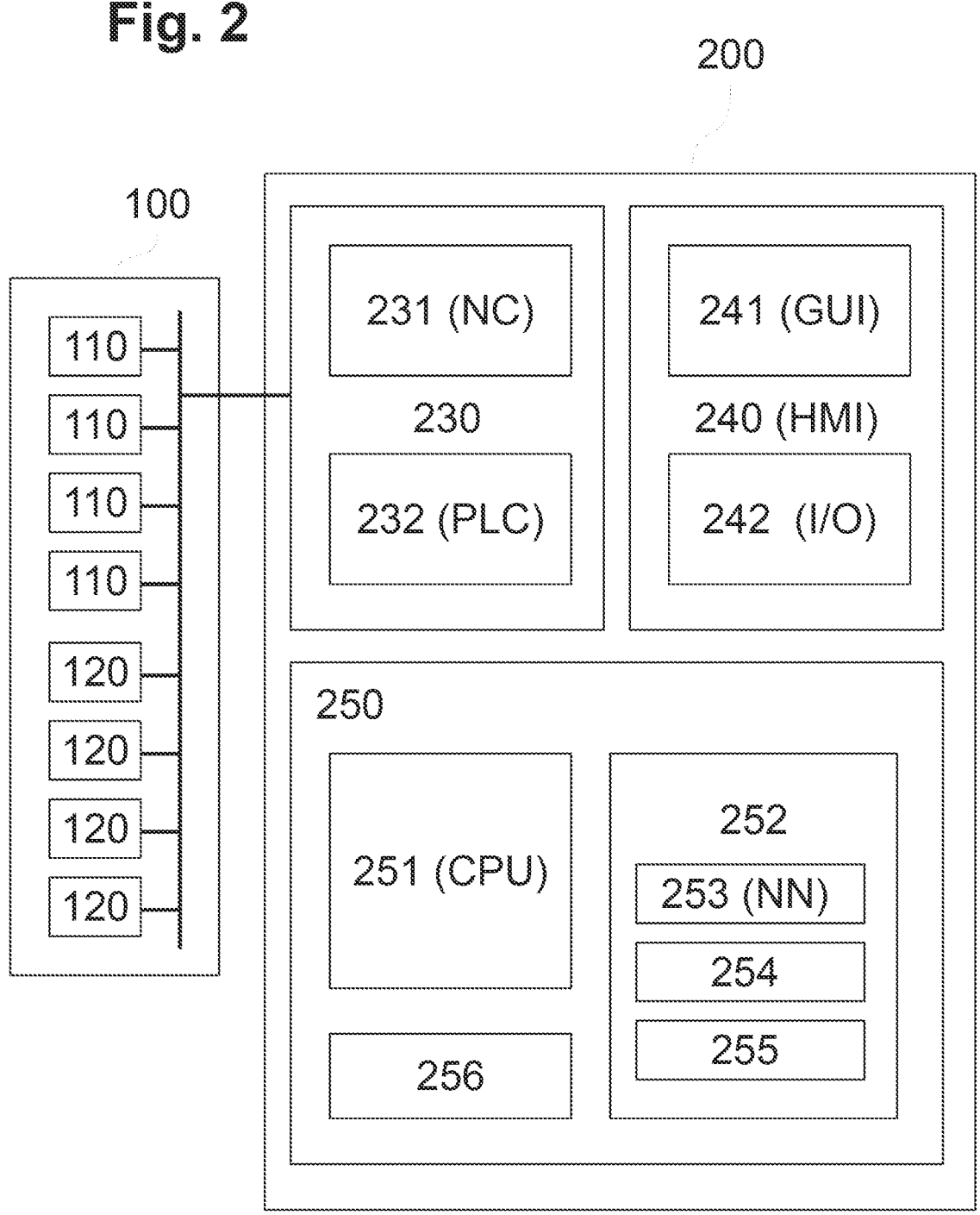
FIG. 2 shows a schematic exemplary diagram of a control device of a numerically controlled machine tool according to exemplary embodiments of the present invention.

FIG. 2 shows a schematic exemplary diagram of a control device 200 of a numerically controlled machine tool 100 according to exemplary embodiments of the present invention.

The machine tool 100 (e.g. the machine tool according to FIG. 1) comprises, for example, a plurality of actuators 110 of the machine tool 100 (e.g., spindle drive, axis drives, etc.) controllable by the control device 200 and optionally a plurality of sensors 120 for outputting sensor signals related to a machine state of the machine tool 100 to the control device 200.

The actuators 110 may include, for example, drives for controllable linear and round axes (swivel and/or rotary axes) for a controlled relative movement between tool and workpiece, and also drives of tool-bearing work spindles (e.g., on milling machines) or workpiece-bearing work spindles (e.g., on lathes).

Furthermore, the actuators 110 may comprise electronically, hydraulically and/or pneumatically controlled valves, pumps or other supply devices for internal or external cooling lubricant supply or compressed air supply. Conveyor means, pallet changers, workpiece changers, tool magazines and other machine tool equipment may also be controlled via drives or circuits or corresponding actuators.

The optional sensors 120 may be, for example, sensors that may be associated with the respective assemblies or components of the machine tool, for example the axes, the drives, axis bearings, the spindles, spindle bearings, a tool magazine, a tool changer, a pallet or workpiece changer, an internal or external cooling lubricant supply device, a chip conveying device, and/or a hydraulic and/or pneumatic control. A large number of different sensors may be provided for the individual assemblies, for example position measuring sensors, current and/or voltage measuring sensors, temperature sensors, force sensors, acceleration sensors, vibration sensors, bearing diagnostic sensors, displacement sensors, level indicating sensors, liquid sensors (e.g., for measuring pH values in cooling lubricant liquids, water proportion measuring sensors for oil, coolant etc.), water content sensors in pneumatic systems, and/or filter condition sensors.

The control unit 200 (control device) comprises, for example, a machine control 230 with an NC control 231 and a programmable logic control 232 (also called SPS or PLC for "Programmable Logic Control").

Furthermore, the control unit 200 comprises, for example, a human-machine interface 240 (also called HMI for "Human-Machine Interface"), with which an operator of the machine tool 100 can control, monitor and/or operate the machine tool 100.

The human-machine interface 240 comprises, for example, a graphical user interface 241 that can be displayed on a monitor or touchscreen (e.g., on the screen 210) (also called GUI for "Graphical User Interface") and an input/output unit 242 (which may comprise the input unit 220).

Furthermore, the control unit 200 comprises, for example, a monitoring unit 250 for monitoring the operating state of the machine tool 100 or for monitoring the machining process on the machine tool 100.

For example, the monitoring unit 250 may be embodied on a computer connected to the NC control 231. Furthermore, the monitoring unit 250 and the NC control 231 may be implemented together on a computer of the control unit 200.

By way of example, the monitoring unit 250 of the control unit 200 comprises a processor 251 (CPU) for data processing and application execution and a data storage device 252 for storing data and programs and applications executable by the processor 251.

Furthermore, the monitoring unit 250 comprises, for example, a communication interface 256 for communication or data exchange with external data processing devices such as servers (e.g., via local or global communication networks or possibly also via WLAN).

By way of example, an artificial or computer-implemented neural network NN is formed on the monitoring unit 250. By way of example, the data storage device 252 comprises a monitoring application 253 which can be executed by the processor 251 and comprises the neural network NN.

By way of example, the data storage device 252 further comprises a storage unit for storing configuration data 254 for the monitoring unit 250 and a storage unit for storing training data 255 for the neural network NN of the monitoring application 253.

By means of the communication system of the control unit 200, for example, the monitoring unit 250 is configured to read or receive data from the machine control 230, in particular from the NC control 231 and/or the programmable logic control 232.

In preferred exemplary embodiments, the monitoring unit 250 may feed data read or received from the machine control 230 as input data to the neural network NN of the monitoring application 253. This may, for example, be carried out continuously or regularly or periodically and preferably in real time.

Here, drive data (e.g., motor currents and drive signals) and/or position data from the machine control 230 are preferably supplied as input data to the neural network NN of the monitoring application 253.

Furthermore, sensor signals from sensors of the machine tool (e.g., from the drive control, the current control, the speed control, the position control and/or the position detection) optionally available at the machine control may be fed to the neural network NN of the monitoring application 253 as input data. This has the advantage that no special sensors provided for process monitoring are required, but rather some or all of the data and information available on the machine control can be used directly.

The input data are preferably fed to the neural network NN of the monitoring application 253 in real time, i.e. particularly preferably during workpiece machining, in particular regularly or periodically or continuously.

The neural network NN of the monitoring application 253 is configured to output output data that indicate an operating state of the machine tool 100, in particular during workpiece machining, on the basis of the input data (e.g. input data read from the machine control or input data supplied by the machine control).

The neural network may already be pre-trained here on the basis of simulated process machining on a virtual machine tool and/or on the basis of training on a machine tool of the same type or of the same construction and/or may be further trained during operation of the machine tool.

In preferred exemplary embodiments, the monitoring unit 250 or the neural network NN of the monitoring application 253 is configured to read the input data from the machine control 230 during the ongoing machining process of the workpiece machining on the machine tool 100, in particular in real time, and to output output data indicating the current operating state of the machine tool.

In preferred exemplary embodiments, the monitoring unit 250 or the neural network NN of the monitoring application 253 is configured to evaluate the output data of the neural network NN.

In preferred exemplary embodiments, the monitoring unit 250 or the neural network NN of the monitoring application 253 is configured to evaluate the output data of the neural network NN for tool monitoring and/or process monitoring on the machine tool 100.

In preferred exemplary embodiments, the monitoring unit 250 or the neural network NN of the monitoring application 253 is configured to output control data influencing the machining process to the machine control on the basis of the input data and/or on the basis of an evaluation of the output data.

In preferred exemplary embodiments, the monitoring unit 250 or the neural network NN of the monitoring application 253 is configured to determine, on the basis of the input data and/or on the basis of an evaluation of the output data, when an abnormal operating state of the machine tool 100 is present.

In preferred exemplary embodiments, the monitoring unit 250 or the neural network NN of the monitoring application 253 is configured to determine, on the basis of the input data and/or on the basis of an evaluation of the output data, when a probability of an abnormal operating state of the machine tool 100 occurring exceeds a predetermined limit value.

In preferred exemplary embodiments, the monitoring unit 250 or the neural network NN of the monitoring application 253 is configured to output control data influencing the machining process to the machine control 230 when it is determined that an abnormal operating state of the machine tool 100 is present and/or a probability of an abnormal operating state of the machine tool occurring exceeds the predefined limit value, e.g. in order to trigger a process interruption, a machine stop (e.g., if a collision occurring on the machine tool is recognized or determined as an abnormal operating state), a drive stop, a tool change (e.g. if a tool breakage occurring in the machine tool is recognized or determined as an abnormal operating state, or if increased tool wear is recognized or determined, or if it is recognized that the tool is missing) etc.

In particular, the monitoring unit 250 or the neural network NN of the monitoring application 253 may preferably be configured to send control data to the machine control that triggers a machine stop when it is determined that a collision is present and/or a probability of a collision occurring on the machine tool 100 exceeds the predefined limit value 230, in particular such that the machine control 230 triggers a machine stop on the machine tool 100 on the basis of the control data.

Alternatively or additionally, the monitoring unit 250 or the neural network NN of the monitoring application 253 may preferably be configured to output control data that trigger an automatic tool change to the machine control 230 when it is determined that a tool breakage or increased tool wear is present and/or a probability of a tool breakage occurring on the machine tool 100 exceeds the predefined limit value, in particular such that the machine controller 230 triggers an automatic tool change on the machine tool 100 on the basis of the control data.

Alternatively or additionally, the monitoring unit 250 or the neural network NN of the monitoring application 253 may preferably be configured to adjust process parameters and/or control data present on the machine control 230 on the basis of the input data and/or on the basis of an evaluation of the output data, for example in such a way that that a machining speed of the machining process is adjusted, in particular by adjusting the feed rates and/or rotational speeds occurring during the machining process. This may be particularly advantageous if excessive bearing wear and/or deviating position data are detected.

In some preferred exemplary embodiments, the input data obtained from the machine control 230 for the neural network NN may specify operating parameters of actuators 110 or drives of the machine tool 100, particularly preferably drive speeds, motor currents and/or actuator signals output to actuators.

In some preferred exemplary embodiments, the input data obtained from the machine control 230 for the neural network NN may specify position values of movable components of the machine tool, in particular actual and/or target positions of linear, round and/or swivel axes of the machine tool 100.

In some preferred exemplary embodiments, the input data obtained from the machine controller 230 for the neural network NN may optionally specify sensor values from sensors 120 of the machine tool 100, particularly preferably sensor values from temperature sensors, force sensors, strain sensors, torque sensors, acceleration sensors, oscillation or vibration sensors and/or structure-borne sound sensors.

Figure 3:
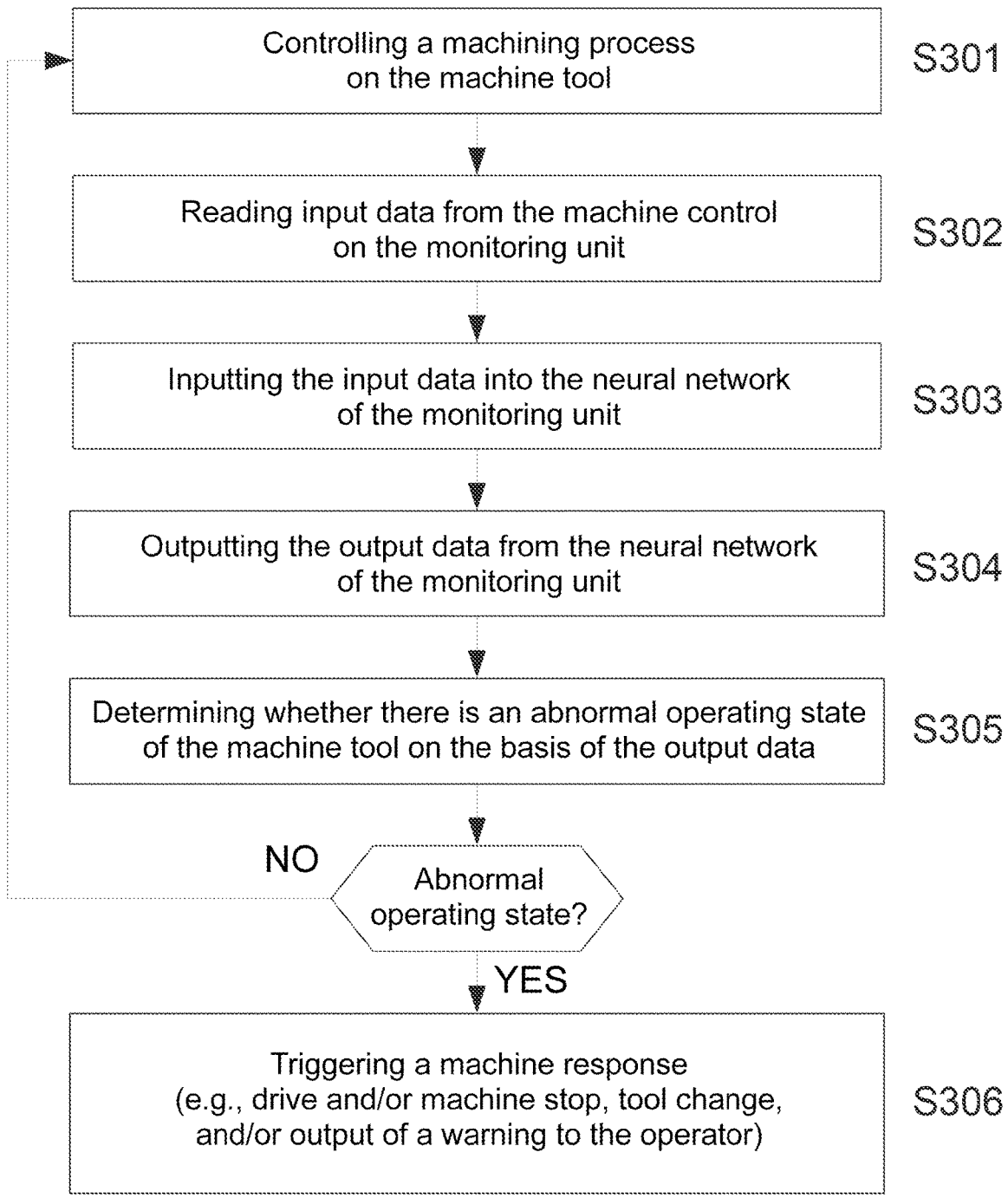
FIG. 3 shows an exemplary flow diagram of a method for monitoring a machine tool according to exemplary embodiments of the present invention.

FIG. 3 shows an exemplary flow diagram of a method for monitoring a machine tool according to exemplary embodiments of the present invention.

In step S301, a machining process on the machine tool 100 is controlled by way of example (e.g. machining a workpiece on the machine tool, e.g. on the basis of control data such as an NC program).

In step S302, data or information available at the machine control 230 is read from the machine control 230 as input data for the neural network NN. This may preferably be carried out continuously or regularly or periodically during the machining process.

In step S303, the input data read from the machine control 230 are input into the neural network NN of the monitoring unit 250. This may preferably be carried out continuously or regularly or periodically during the machining process.

In step S304, the output data of the neural network NN determined on the basis of the input data are output.

In step S305, it is determined on the basis of the output data of the neural network NN output at the monitoring unit 250 whether there is an abnormal operating state of the machine tool 100.

If there is no abnormal operating state of the machine tool 100, the machining process is continued without interruption (see step S301).

If, on the basis of the output data of the neural network NN at the monitoring unit 250, it is determined or detected that an abnormal operating state of the machine tool 100 is present or has occurred, a corresponding machine response is triggered in step S306, for example by the monitoring unit 250 outputting a signal triggering a corresponding machine response to the machine control 230.

A correspondingly assigned machine response may be triggered as a function of the output data or the abnormal operating state detected.

If a collision is detected, a machine stop may be triggered directly and immediately, for example.

If a tool or excessive tool wear (a worn tool) is detected, for example, the machining process may be interrupted and an automatic tool change may be triggered, e.g., to insert a corresponding sister tool and continue the machining process with the inserted sister tool after only a very short downtime. This has the advantage that wear-dependent tool changes may be performed optimally and automatically at the right time, so that part quality and tool utilization can be optimally adjusted.

In addition, a machine stop or a drive stop may be triggered when conditions are detected that require maintenance or manual inspection of machine parts, such as the detection of bearing damage or excessive bearing wear.

In exemplary embodiments, the neural network may be designed to be learnable in the context of a fuzzy system by means of bidirectional conversion. In addition, training data may be fed to the neural network, wherein the training data may be generated on the basis of process monitoring of simulated machine tools and/or on the basis of other machine tools of the same machine type that are already in operation.

In summary, according to exemplary embodiments of the present invention, it is proposed to carry out tool or process monitoring of the machine tool by means of an artificial or computer-implemented neural network provided on the control device of the machine tool. Such tool or process monitoring may advantageously protect the machine and/or the workpieces from damage, guarantee optimal tool use and, if necessary, provide starting points for process optimization.

Thus, productivity can be increased and the overall life cost of the machine tool can be reduced. At the same time, tool and process monitoring contributes to quality assurance and allows for workpiece control and quality and process documentation.

Advantageously, direct error or problem detection (e.g. collision detection, detection of broken, worn or missing tools) may be made possible and a corresponding response, e.g. machine stop or tool change, may be triggered automatically as well as immediately and without delay. This also allows for further cost reductions and fewer rejects, e.g. through wear-dependent tool changes or bearing maintenance.

In addition, by continuously adjusting the process parameters on the basis of the output data of the neural network, an optimized machining speed can be achieved. Furthermore, there are advantages due to the possibility of evaluating the historical output data and the historical training data, e.g. for documentation and statistics.

In summary, in particular the following advantages can be achieved: comprehensive protection of machine, workpiece and tool, monitoring in real time, optimal tool utilization, monitoring of part quality (e.g. via documentation and process analysis), reduction of rejects and/or adaptation to complex processes or machining.

In addition, there is the advantage in exemplary embodiments that sensorless monitoring can also be provided due to the possibility of utilizing data or information (e.g., drive data and/or positioning data) available at the machine control, or at least some or additional sensors can be dispensed with. In further exemplary embodiments, the input data of the neural network may be supported with sensor data or provided from sensor data, e.g. by additional or alternative sensors, e.g. for strain, force, active power, torque, vibration, acceleration, structure-borne sound and/or temperature, etc.

Examples and exemplary embodiments of the present invention and advantages thereof have been described in detail above with reference to the accompanying figures. It should again be emphasized that the present invention is in no way limited or restricted to the exemplary embodiments described above and implementation features thereof, but rather further comprises modifications of the exemplary embodiments, in particular those that are included within the scope of protection of the independent claims via modifications of the features of the examples described or via combinations of one or more individual features of the examples described.

The invention claimed is:

1. A control device for use on a numerically controlled machine tool, comprising:
   a machine control unit for controlling actuators of said machine tool for a machining process of a workpiece to be performed on said machine tool on the basis of control data in the form of an NC program, and
   a monitoring unit comprising a computer-implemented neural network for process monitoring on said machine tool,
   wherein said monitoring unit is configured to read input data from said machine control unit and to output output data indicating an operating state of said machine tool, and
   said neural network of said monitoring unit is configured to evaluate output data indicating the operating state of said machine tool for process monitoring on the machine tool in order to detect errors in the machining process,
   characterized in that
   said neural network of said monitoring unit is configured to read input data from said machine control unit during the ongoing process of machining a workpiece and to output output data indicating a current operating state of said machine tool during workpiece machining; and
   said monitoring unit is configured to adjust process parameters, by the neural network, of the machining process present on the machine control unit, which relate to workpiece machining by a work spindle of the machine tool carrying a tool or a workpiece, based on an evaluation of the output data indicating the current operating state of said machine tool.

2. The control device according to claim 1, characterized in that
said monitoring unit, in particular said neural network of said monitoring unit, is configured to adjust the process parameters of the machining process in such a way that a machining speed of the machining process is adjusted.

3. The control device according to claim 2, characterized in that
said monitoring unit, in particular said neural network of said monitoring unit, is configured to adjust the process parameters in order to adjust the machining speed of the machining process in such a way that feed rates and/or rotational speeds occurring during the machining process are adjusted.

4. The control device according to claim 1, characterized in that
said monitoring unit, in particular said neural network of said monitoring unit, is configured to continuously adjust the process parameters of the machining process.

5. The control device according to claim 1, characterized in that
said neural network of said monitoring unit is configured to read the input data from said machine control unit during the ongoing machining process of the workpiece to be performed on said machine tool, in particular in real time, and to output the output data indicating the current operating state of said machine tool.

6. The control device according to claim 1, characterized in that
said monitoring unit, in particular said neural network of said monitoring unit, is further configured to evaluate the output data indicating the current operating state of said machine tool for tool monitoring on said machine tool.

7. The control device according to claim 1, characterized in that
said monitoring unit, in particular said neural network of said monitoring unit, is configured to output control data influencing the machining process to said machine control unit on the basis of the input data from said machine control unit and/or on the basis of the evaluation of the output data indicating the current operating state of said machine tool.

8. The control device according to claim 1, characterized in that
said monitoring unit, in particular said neural network of said monitoring unit, is configured to determine an abnormal operating state of said machine tool on the basis of the input data from said machine control unit and/or on the basis of the evaluation of the output data indicating the current operating state of said machine tool, such that a collision occurring on said machine tool between machine parts and a tool and/or the workpiece and/or a tool breakage occurring on said machine tool and/or the absence of the tool to be used on the machine tool in the machining process and/or increased tool wear of a tool used in the machining process occurring on said machine tool is detected.

9. The control device according to claim 8, characterized in that
said monitoring unit, in particular said neural network of said monitoring unit, is configured to output control data influencing the machining process to said machine control unit when it is determined that an abnormal operating state of said machine tool is present.

10. The control device according to claim 9, characterized in that
said monitoring unit, in particular said neural network of said monitoring unit, is configured to output control data triggering a machine stop to said machine control unit when it is determined that the abnormal operating state of said machine tool is present and/or a probability of the abnormal operating state of said machine tool occurring exceeds the predetermined limit value, in particular such that said machine control unit triggers a machine stop on said machine tool on the basis of the control data.

11. The control device according to claim 9, characterized in that
said monitoring unit, in particular said neural network of said monitoring unit, is configured to output control data triggering an automatic tool change to said machine control unit when it is determined that the abnormal operating state of said machine tool is present and/or a probability of the abnormal operating state of said machine tool occurring exceeds the predefined limit value, in particular such that said machine control unit triggers an automatic tool change on said machine tool on the basis of the control data.

12. The control device according to claim 1, characterized in that
said monitoring unit, in particular said neural network of said monitoring unit, is configured to determine, on the basis of the input data from the machine control unit and/or on the basis of the evaluation of the output data indicating the current operating state of said machine tool, when a probability of an abnormal operating state of said machine tool occurring exceeds a predetermined limit value such that a likely collision occurring between machine parts and a tool and/or the workpiece and/or a likely tool breakage occurring on said machine tool and/or a likely absence of the tool to be used on said machine tool in the machining process and/or a tool wear exceeding the limit value of the tool used in the machining process is detected.

13. The control device according to claim 12, characterized in that
said monitoring unit, in particular said neural network of said monitoring unit, is configured to output control data influencing the machining process to said machine control unit when it is determined that an abnormal operating state of said machine tool is present and/or a probability of an abnormal operating state of said machine tool occurring exceeds the predefined limit value.

14. The control device according to claim 1, characterized in that
said monitoring unit, in particular said neural network of said monitoring unit, is configured to adjust control data present at said machine control unit on the basis of the input data from the machine control unit and/or on the basis of the evaluation of the output data indicating the current operating state of said machine tool.

15. The control device according to claim 1, characterized in that
the input data from the machine control unit indicate operating parameters of actuators or drives of said machine tool, in particular drive speeds, motor currents and/or actuator signals output to actuators.

16. The control device according to claim 1, characterized in that the input data from the machine control unit indicate position values of movable components of said machine tool, in particular actual and/or target positions of linear, rotary and/or swivel axes of said machine tool.

17. The control device according to claim 1, characterized in that
the input data from the machine control unit indicate sensor values from sensors of said machine tool, in particular sensor values from temperature sensors, force sensors, strain sensors, torque sensors, acceleration sensors, oscillation or vibration sensors and/or structure-borne sound sensors.

18. The control device according to claim 1, characterized in that
said monitoring unit includes an internal data storage device and/or is configured for communication with an external data storage device,
wherein said monitoring unit is configured to store the input data from the machine control unit and/or output data indicating the current operating state of said machine tool in said internal and/or external data storage device, and/or
wherein said monitoring unit is configured to store evaluation data generated on the basis of an evaluation of the input data from the machine control unit and/or on the basis of the evaluation of the output data indicating the current operating state of said machine tool in said internal and/or external data storage device.

19. The control device according to claim 1, characterized in that
said control device further comprises a human-machine interface that can be operated by an operator, in particular with a graphical user interface,
wherein said monitoring unit is configured to output output data from said neural network indicating the current operating state of said machine tool to the operator on said human-machine interface.

20. A machine tool comprising a control device according to claim 1.

21. A method for monitoring a numerically controlled machine tool, in particular by means of a control device according to claim 1, said method comprising:
controlling actuators of the machine tool for a machining process of workpiece machining on the machine tool on the basis of control data in the form of an NC program by means of a machine control device;
monitoring the machining process for a workpiece to be performed on said machine tool by means of a monitoring unit for process monitoring during the control of actuators of said machine tool for the machining process for a workpiece to be performed on said machine tool, in particular on the basis of control data,
wherein the monitoring comprises:
reading input data from said machine control unit into a computer-implemented neural network of said monitoring unit during the ongoing machining process;
outputting output data indicating the current operating state of said machine tool during workpiece machining from said neural network of said monitoring unit;
evaluating the output data indicating the current operating state for process monitoring on the machine tool by means of the neural network of the monitoring unit;
adjusting process parameters of the machining process, which are present at the machine control unit and relate to the workpiece machining by means of a work spindle of the machine tool carrying a tool or a workpiece, on the basis of the output data evaluated by the neural network of the monitoring unit.

22. A non-transitory computer program product, comprising instructions which, when the program is executed by a computer connected to a numerically controlled machine tool or a control device of a numerically controlled machine tool, in particular according to claim 1, cause it to carry out a method comprising:
controlling actuators of the machine tool for a machining process of workpiece machining on the machine tool on the basis of control data in the form of an NC program by means of a machine control device;
monitoring the machining process for a workpiece to be performed on said machine tool by means of a monitoring unit for process monitoring during the control of actuators of said machine tool for the machining process for a workpiece to be performed on said machine tool, in particular on the basis of control data,
wherein the monitoring comprises:
reading input data from said machine control unit into a computer-implemented neural network of said monitoring unit during the ongoing machining process;
outputting output data indicating the current operating state of said machine tool during workpiece machining from said neural network of said monitoring unit;
evaluating the output data indicating the current operating state for process monitoring on the machine tool by means of the neural network of the monitoring unit; and
adjusting process parameters of the machining process, which are present at the machine control unit and relate to the workpiece machining by means of a work spindle of the machine tool carrying a tool or a workpiece, on the basis of the output data evaluated by the neural network of the monitoring unit.

* * * * *